United States Patent
Sohlemann et al.

[15] 3,681,961
[45] Aug. 8, 1972

[54] EXTRUSION PRESS WITH A HYDRO-MECHANICAL ROTARY DRIVE FOR THE WORKING SPINDLE

[72] Inventors: Just Sohlemann; Gerhard Muller, both of Riemerling, Germany

[73] Assignee: Messerschmitt-Bolkow-Blohm Gesellschaft Mit Beschrankter Haftung, Munich, Germany

[22] Filed: March 26, 1970

[21] Appl. No.: 31,031

[30] Foreign Application Priority Data

April 1, 1969 Germany..........P 19 16 708.9

[52] U.S. Cl. .................................72/82, 82/21 A
[51] Int. Cl. .................................B21b 5/00
[58] Field of Search ..............................82/28, 21 A; 72/82–87, 95, 96

[56] References Cited

UNITED STATES PATENTS

| | | |
|---|---|---|
| 3,046,924 | 7/1962 | Kane ..............................72/85 |
| 3,411,334 | 11/1968 | Ernestus ..........................72/84 |
| 2,098,213 | 11/1937 | Benedek ..........................82/28 |
| 2,098,214 | 11/1937 | Beneder ..........................82/28 |
| 1,957,915 | 5/1934 | Stiefel ..............................72/85 |
| 2,522,257 | 9/1950 | Curtis ..............................72/124 |
| 3,517,535 | 6/1970 | Sporck ............................72/85 |
| 3,433,040 | 3/1969 | Lenz ................................72/126 |

*Primary Examiner*—Richard J. Herbst
*Attorney*—McGlew and Toren

[57] ABSTRACT

An extrusion press includes a hydro-mechanical rotary drive for driving the working spindle which is arranged inside the spindle sleeve and which drives through a coaxially arranged transmission directly on the working spindle. The feed system for moving the working spindle axially during a working stroke is arranged coaxially to the working spindle and it also comprises a hydro-mechanical rotary drive.

1 Claim, 3 Drawing Figures

INVENTORS
Just Söhlemann
Gerhard Müller

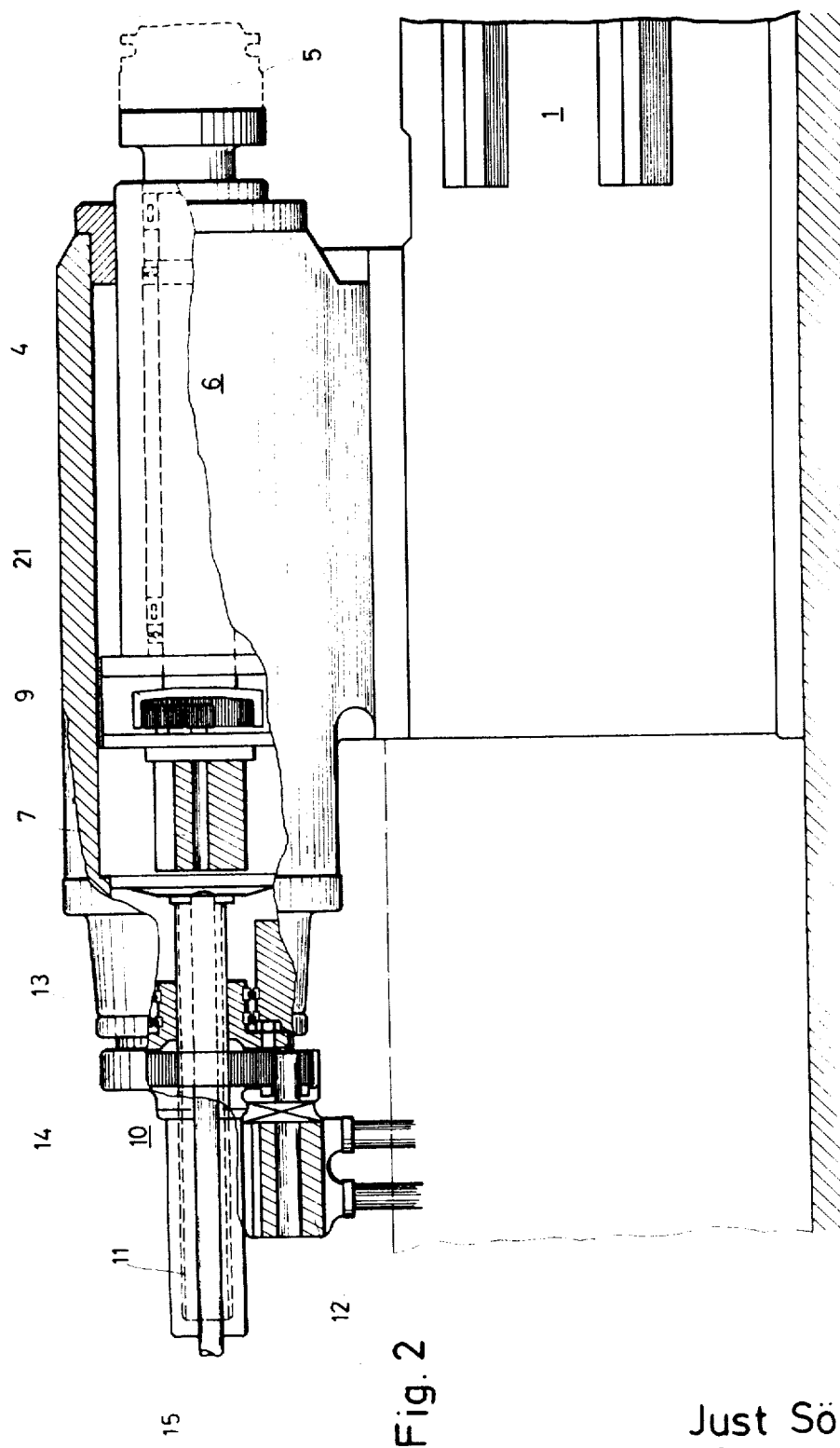

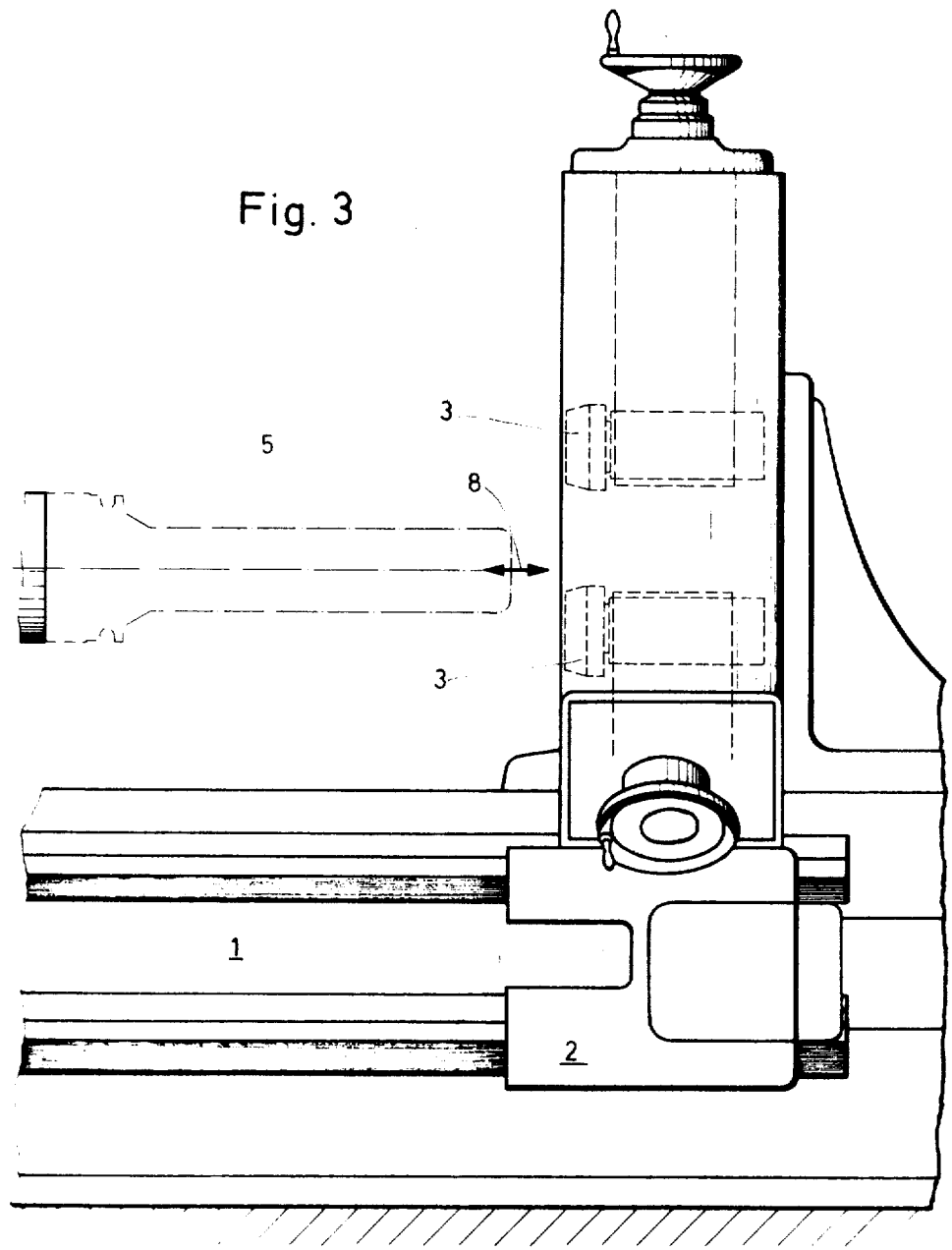

EXTRUSION PRESS WITH A HYDRO-MECHANICAL ROTARY DRIVE FOR THE WORKING SPINDLE

SUMMARY OF THE INVENTION

This invention relates in general to the construction of the extrusion presses and in particular to a new and useful extrusion press having a stationary roller block and a working spindle which runs in an axially displaceable spindle sleeve and which is driven by a hydro-mechanical rotary drive.

The manufacture of axially symmetrical hollow bodies of various types and forms by extrusion is known. The advantages of extruding such devices lie particularly in the possibility of achieving high manufacturing accuracies even when using high-strength steel in series-production.

In general the extrusion presses, which are also referred to as "stretch smoothing lathes," work with one or several extrusion rollers which act in a single roller method unilaterally and in a twin-roller method in an opposite direction, and in a three-roller method in an isosceles or equilateral triangle outline on the workpiece. The extrusion rollers are advanced, for example, in a turret lathe support, in longitudinal directions toward the rotating tool spindle and the workpiece arranged thereon. Rotary movement and feed movement are thus distributed conventionally over the headstock and the support.

In another known extrusion press a stationary three-roller block with equilateral arrangement of the extrusion rollers is employed and the drive and the feed is arranged in the spindle. This arrangement has the advantage of optimum centering of the spindle with the tool (extrusion mandrel) and the workpiece to be deformed (sleeve) in the stationary roller block (extrusion rollers). These and the other known machines are all-purpose machines and are not designed for the required precision, reliability and economy of series production.

In a precision and series production in a continuous operation, the disadvantages lie in the insufficient geometric stability of the system as well as in the softness and unreliability of the driving elements, that is, the spindle drive, the feed, the roller and the roller adjustment. In addition, the flexibility of the construction with respect to the size of the workpiece is insufficient. If a wall thickness diameter ratio of more than 1:100 is required, with a precision which is in the range of $10^{-2}$mm. related to the diameter, the ovality and the sag of the longitudinal axis of such hollow bodies, with the known extrusion presses are no longer adequate.

In accordance with the present invention, there is provided an extrusion press with a stationary roller block and a working spindle which runs in an axially displaceable spindle sleeve and is driven by a hydro-mechanical rotary drive which is arranged within the sleeve. The use of such a rotary drive provides a compact and very stable construction for the drive of the working spindle and also for the feed, with the feed system also arranged coaxially in respect to the working spindle and within the sleeve.

Accordingly, it is an object of the invention to provide an extrusion device which includes a stationary roller block and a working spindle which runs in an axially displaceable sleeve and which includes a hydro-mechanical rotary drive for driving the working spindle which is arranged coaxially with respect to the spindle.

A further object of the invention is to provide an extrusion press which includes a hydro-mechanical rotary drive for driving the working spindle and for operating the feed system for the working spindle.

A further object of the invention is to provide an extrusion press which is simple in design, rugged in construction and economical to manufacture.

The various features of novelty which characterize the invention are pointed out with particularity in the claims annexed to and forming part of this specification. For a better understanding of the invention, its operating advantages and specific objects attained by its uses, reference should be had to the accompanying drawings and descriptive matter in which there is illustrated a preferred embodiment of the invention.

BRIEF DESCRIPTION OF THE DRAWINGS

In the drawings:

FIG. 2 is an enlarged partial elevational and partial sectional view of a portion of the press indicated in FIG. 1; and FIG. 3 is an enlarged partial elevational view similar to FIG. 2 showing the remaining portion of the extrusion press.

GENERAL DESCRIPTION OF THE PREFERRED EMBODIMENT

Figure 1:
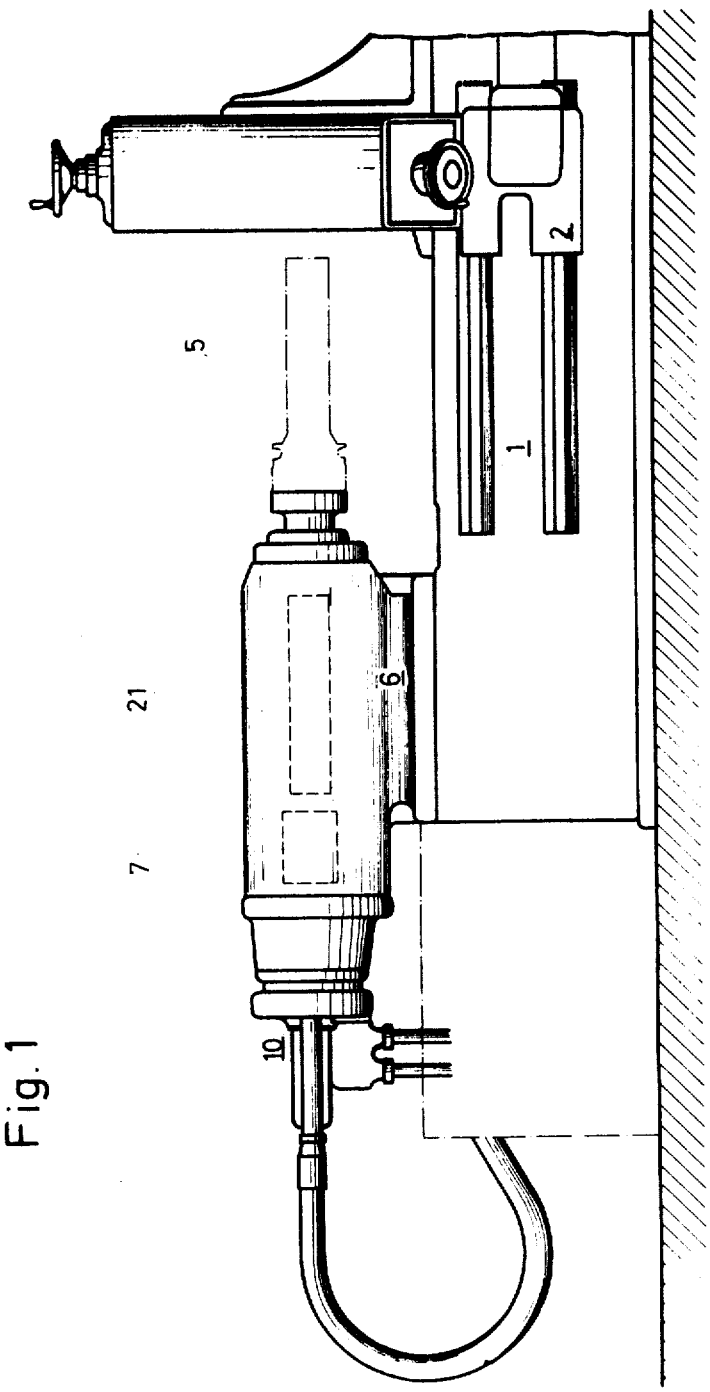
FIG. 1 is a partial side elevational view of an extrusion press constructed in accordance with the invention.

Referring to the drawings in particular the invention embodied therein comprises an extrusion press which includes a stationary roller block 2 and a headstock 6 which are mounted in spaced relationship on a machine bed 1. The roller block carries a plurality of extrusion rollers 3 and, in the preferred arrangement, three separate sets of extrusion rollers, only two of which are shown. The rollers 3 engage the workpiece which is arranged on the extrusion mandrel 5 and relative motion is established between the mandrel 5 and the rollers 3 in the directions indicated by the arrow 8.

In accordance with the invention the relative motion between the mandrel 5 and the rollers 3 is effected by means of the working spindle 21 which is mounted for axial shifting movement and rotatable movement, within a spindle sleeve 4. A hydro-mechanical rotary drive 7 which is arranged coaxially in respect to the working spindle 21 acts directly on the spindle 21 through a transmission 9. This drive 7 receives its power through an oil pipe system 15 which may be made so small that it can also be accommodated within the spindle sleeve 4. The favorable speed-torque characteristics permits a variation of the speed in wide ranges so that the speed of the extrusion mandrel 5 can be varied without a major torque variation in the ratio of from 1 to 5 and even more, for example, by means of a regulating pump. The drive works without slip unlike the known devices which require interconnecting belts. Inaccuracies in the finished workpiece which are caused by intermittent operation of the prior art devices will not occur with the present inventive constructions.

The head stock contains a coaxially arranged feed system generally designated 10 which comprises a threaded spindle 11 which is driven in axial directions by a rotary drive 12. The threaded spindle is rigidly connected with the end of the headstock 6 which encloses the hydro-mechanical rotary drive 7. Power transmission is effected by a spindle nut (not shown) which is mounted in the headstock 6 and which is driven by the hydro-mechanical rotary drive 12 by means of the transmission 14. The hydraulic motor which is incorporated in the hydro-mechanical rotary drives 7 and 12, are driven in the required speed ranges by regulating pumps associated therewith. The transmission 14 advantageously includes an automatic, primarily electroautomatic switching system of known design for rapid motion.

The coaxial arrangements of the two driving systems 7 and 12 permit a compact construction which cannot be achieved with the conventional driving elements such as electro-motors with belt drives, variable speed transmissions and similar transmission elements as well as purely hydraulic feed system, such as a cylinder and piston.

Because of the use of few exactly controllable elements of high power ratio, an optimum of constancy, life expectancy and reliability is achieved with concentrated constructional arrangements; and the arrangement permits elimination of many complicated transmission elements. The compact construction permits operation under relatively high load with a much smaller dimensioning of the parts because it represents only a moderate partial load which does not impair the life expectancy of the machine and the reliability of its operations.

The rotary drive 7 which is arranged inside the spindle sleeve 4 is completely independent of the travel of the spindle sleeve, that is the stroke of the sleeve. This is because the oil pipes 15 are led out of the headstock 6 and extend the complete length of the operating stroke of the spindle sleeve 4. The length of stroke of the spindle sleeve 4 depends merely on the length of the threaded spindle 11 which is employed and can thus be adapted to any requirement and machine size.

We claim:

1. A stretch-smoothing lathe, comprising a headstock, a spindle sleeve movable backwardly and forwardly in said headstock, a stationary roller block having roller means thereon for engagement with a workpiece in alignment with said spindle, a mandrel carried on said spindle sleeve and movable therewith toward and away from said roller, a working spindle arranged within said spindle sleeve, a first hydro-mechanical rotary drive arranged inside said spindle sleeve and coaxial to said working spindle and connected to said working spindle for driving said spindle, a feed system for said working spindle comprising a rotatable feed spindle, and a second hydro-mechanical rotational drive connected to said feed spindle for rotating said spindle, a transmission located between said hydro-mechanical drive and said feed spindle, said transmission having an automatic switching system for rapid motion.

* * * * *